United States Patent [19]

Yang

[11] Patent Number: 5,694,557
[45] Date of Patent: Dec. 2, 1997

[54] TIME MULTIPLEXING ADDRESS AND DATA ON AN EXISTING PC PARALLEL PORT

[75] Inventor: Ivan Wong Yin Yang, Unionville, Canada

[73] Assignee: ATI Technologies Incorporated, Thornhill, Canada

[21] Appl. No.: 288,306

[22] Filed: Aug. 10, 1994

[51] Int. Cl.$^6$ ............................................. G06F 3/00
[52] U.S. Cl. .................... 395/309; 395/871; 395/421.01
[58] Field of Search ................................ 395/823, 824, 395/871, 882, 284, 421.01, 306, 308, 309

[56] References Cited

U.S. PATENT DOCUMENTS

| | | | |
|---|---|---|---|
| 4,349,870 | 9/1982 | Shaw et al. | 395/800 |
| 5,191,656 | 3/1993 | Forde, III et al. | 395/287 |
| 5,276,443 | 1/1994 | Gates et al. | 340/825.06 |
| 5,359,717 | 10/1994 | Bawles et al. | 395/309 |
| 5,457,785 | 10/1995 | Kikinis et al. | 395/308 |

*Primary Examiner*—Jack B. Harvey
*Assistant Examiner*—Jeffrey K. Seto
*Attorney, Agent, or Firm*—Pascal & Associates

[57] ABSTRACT

A method of communicating with peripheral devices via a personal computer parallel port having computer data bus lines but no address bus lines comprising connecting the input of a multiplexer to the parallel port, the multiplexer having a data bus input and a databus output and an address bus output, applying address data to the computer data bus, applying an address control signal to the multiplexer and passing the address data only to the address bus output as a result thereof.

13 Claims, 1 Drawing Sheet

1

TIME MULTIPLEXING ADDRESS AND DATA ON AN EXISTING PC PARALLEL PORT

FIELD OF THE INVENTION

This invention relates to the field of personal computers, and in particular to a novel design of a parallel port.

BACKGROUND TO THE INVENTION

The standard parallel port of a personal computer was designed to communicate with a single peripheral device, such as a printer, modem, etc., and typically has eight bidirectional data lines and several control lines. The small computer communication interface (SCSI) port can communicate with many devices, but is comprised of many more lines, a group of which carries address data. Many personal computers do not have an SCSI port, and have a limited number of parallel ports.

With the proliferation of many different kinds of peripherals which do not have SCSI interfaces, such as different kinds of scanners, different kinds of printers, modems having different capabilities, local area network (LAN) interfaces, remote controls for computers, MIDI devices, household appliance controllers, etc., it is difficult for the user to easily connect many such devices to a single personal computer. To use them the user must disconnect and reconnect such devices, which makes use of such peripherals unwieldy, and can inhibit a computer user from purchasing additional peripherals for an existing computer, thus denying himself advantageous use of those peripherals and inhibiting expansion of the peripheral industry.

SUMMARY OF THE INVENTION

The present invention is a means and method for facilitating the interfacing of plural peripherals to a single parallel port of a personal computer. As a result, the user can connect as many peripheral devices as is desired, within any addressing limitations created by the number of data carrying lines of the parallel port, etc.

In accordance with the present invention, the data carrying lines of a parallel bus connected to the parallel port are multiplexed, and carry either address data, computer data for being output to the peripheral device, or peripheral device data for input to the computer. A control signal generated within the computer, e.g. by its microprocessor, defines to the multiplexer whether the data carried on the data lines is address data, computer data for being output to the peripheral device, or peripheral data for reception by the computer. As a result the multiplexer applies the address data to an address port, applies the computer data to a data output port, or peripheral data to the computer databus.

In accordance with an embodiment of the invention a method of communicating with peripheral devices via a personal computer parallel port having computer data bus lines but no address bus lines is comprised of the steps of connecting the input of a multiplexer to the parallel port, the multiplexer having a data bus input and a databus output and an address bus output, applying address data to the computer data bus, applying an address control signal to the multiplexer and passing the address data only to the address bus output as a result thereof.

In other steps, the address data and the address control signals are ceased and are replaced by data either for transmitting to or for reception from a peripheral device and a control signal signifying which form of data is to be carried by the computer data bus.

2

In accordance with another embodiment, a method of communicating with peripheral devices via a personal computer parallel port is comprised of the steps of multiplexing a data bus connected to the parallel port between address data, computer data for writing to an addressed peripheral device, and peripheral data received from the addressed peripheral device, and providing control signals signifying states defining which of the address data, computer data or the peripheral data is to be carried by the data bus.

In accordance with another embodiment, a bus interface for interconnecting a computer data bus with a peripheral device is comprised of a multiplexer having a computer databus port, a peripheral databus port and a peripheral address bus port, apparatus for receiving an address control signal and for passing data appearing at the computer databus port to the peripheral address bus port, apparatus for receiving a write control signal and for passing data at the computer databus port to the peripheral databus port, and apparatus for receiving a read control signal and for passing data at the peripheral databus port to the computer databus.

BRIEF INTRODUCTION TO THE DRAWINGS

A better understanding of the invention will be obtained by reading the description of the invention below, with reference to the following drawings, in which.

DETAILED DESCRIPTION OF THE INVENTION

Figure 1:
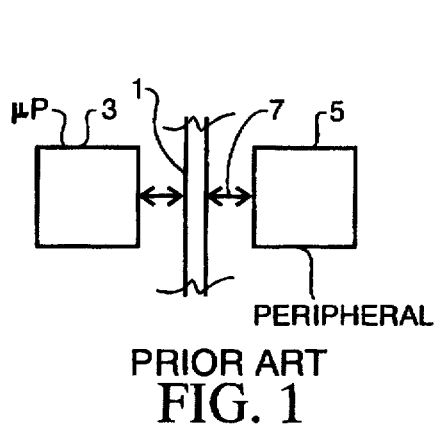
FIG. 1 is a block diagram of a prior art parallel bus.

FIG. 1 illustrates a parallel port in accordance with the prior art. A personal computer has an expansion bus 1, to which a microprocessor 3 is connected. A peripheral device 5 is connected to the expansion bus via a parallel port, the connection being identified by the reference numeral 7.

A standard parallel bus of a personal computer is comprised of lines as follows, each of which appearing at the parallel port:

(a) 8 bidirectional lines carrying computer data, (b) 5 input control lines, carrying —ACK, BUSY, PE, SLCT and —ERROR signals, the lines being identified below with reference to these signals, (c) 4 output control lines, carrying —STROBE, —AUTO FEED XT, —INIT and —SLIC IN signals, and (d) common ground signals.

It is evident that there is no way to address the peripheral device which is connected to the parallel port, and therefore only a single peripheral device 5 can be connected to a single parallel port.

Figure 2:
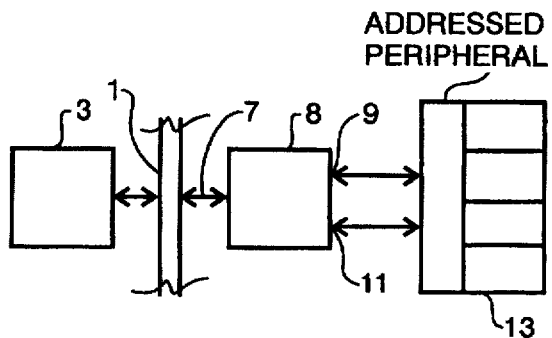
FIG. 2 is a block diagram illustrating the present invention.

FIG. 2 illustrates the present invention in block diagram. The microprocessor 3 is connected to the expansion bus 1 as in the prior art. However the parallel port connection 7 is connected to a multiplexer 8. The multiplexer 8 has a peripheral address port 9 and a peripheral data port 11, to which one or plural peripheral devices 13 can be connected.

It should be noted that a single peripheral device can be connected, which is addressable by data carried on the peripheral address port, or a single peripheral device can be connected which is comprised of several elements, each of which can be separately addressed (as shown in FIG. 2), or plural separate peripheral devices can be connected in parallel to the same peripheral address and data ports 9 and 11, each of which being separately addressed by a distinct address signal carried on the peripheral address port.

Control lines in the parallel port connection connect the expansion bus to control inputs of the multiplexer.

In operation, the microprocessor applies address data to the data lines of the peripheral bus, which is carried to the parallel port connection, and to the multiplexer 8. An address control signal on a control line causes the multiplexer to apply the address data to the peripheral address port, which is carried to the peripheral devices. As a result, a peripheral device which has a corresponding address, is addressed. The address control data is then removed, reversed in polarity or an inhibition signal replaces it.

The microprocessor then applies computer data to parallel data connection 7, and a data write control signal to multiplexer 8. The multiplexer is thereby controlled to, pass the data carried by the parallel data connection 7 to peripheral data port 11, and is received therefrom by the addressed peripheral. The data write control signal is then removed, inverted in polarity, or the like.

The microprocessor can apply a data read control signal to the multiplexer 8. As a result the multiplexer is controlled to pass data appearing at the peripheral data port 11 to the peripheral port connection 7, for transmission to the expansion bus 1 and access by the microprocessor 3.

Figure 3:
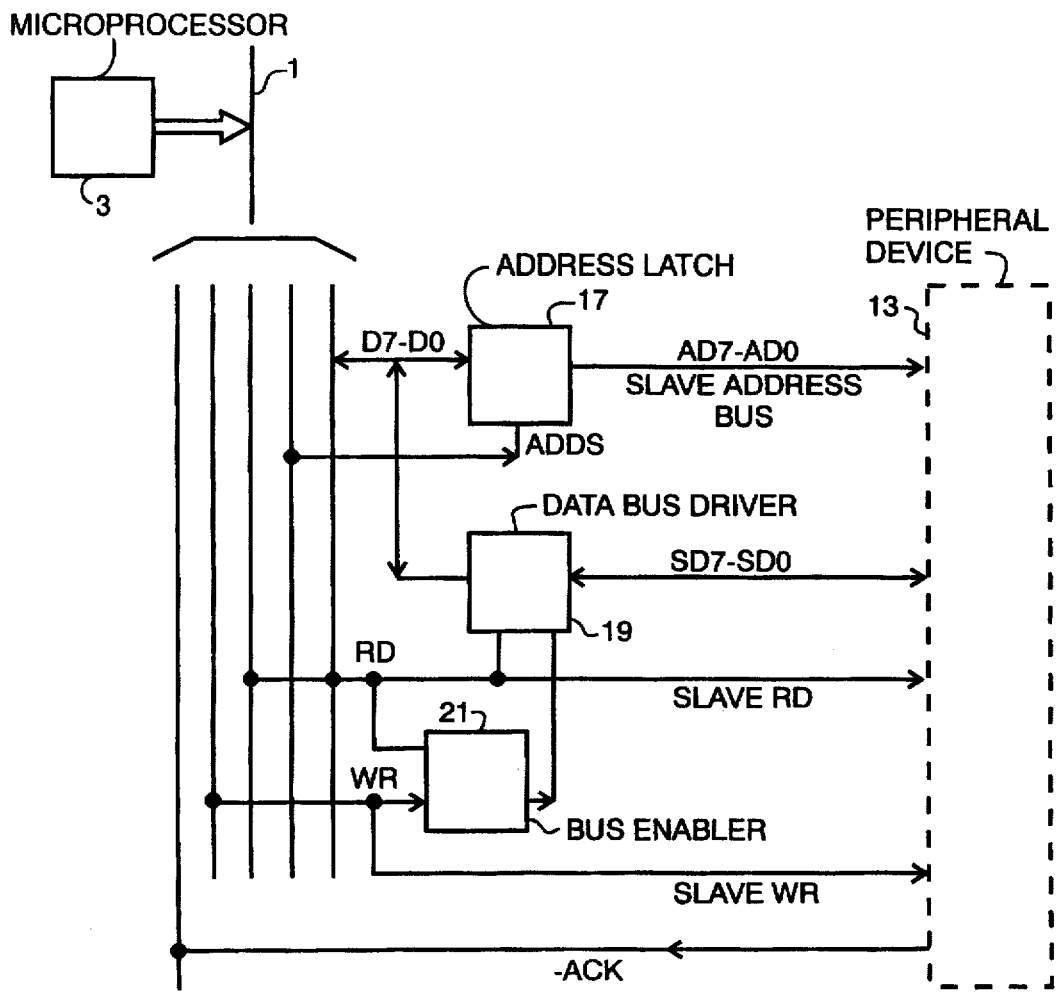
FIG. 3 is a block diagram illustrating a structure which can provide the present invention in more detail.

A more detailed structure is illustrated in FIG. 3. The multiplexer is comprised of address latch 17, data bus driver 19 and bus enabler 21. The data lines of the parallel port connection 7 are connected to the inputs of the address latch 17 and of the data bus driver 19. The output of the address latch 17 forms the peripheral address port. The bus connected to this output is labeled SLAVE ADDRESS BUS, and can be comprised of lines AD7–AD0.

The data bus driver 19 has a port which forms the peripheral data port, and is labeled SLAVE DATA BUS, and can be comprised of data lines SD7–SD0. The SLAVE DATA BUS is bidirectional.

A control line of parallel port connection 7 labeled RD carries a read control signal to the data bus driver 19. That line is also carried to the peripheral device via a line labeled SLAVE RD and to bus enabler 21.

A control line of parallel port connection 7 labeled WR carries a write control signal to bus enabler 21, and via the line labeled SLAVE WR to the peripheral device 13.

In operation, the microprocessor sets the peripheral bus 1, and thus the parallel port connection 7 to an output mode. It then loads the data bus leads D7–D0 with address bits (eight bits, in the 8 data line embodiment shown). It then sets the ADDS control lead and the WR control leads to low logic level, to indicate that an address signal appears on the data leads. This causes the address latch 17, which receives the ADDS signal, to latch the address data signal, and the address data signal appears on the SLAVE ADDRESS BUS and thus on the peripheral address port.

The WR signal is applied to the bus enabler 21, which inverts it and applies a high logic level to the S input of data bus driver 19. This causes it to block transfer of data from the data lines D7–D0 to the SLAVE DATA BUS.

The low logic level WR signal is also received on the SLAVE WR line by the peripheral device 13, which indicates to it that address data is carried by the SLAVE ADDRESS BUS, rather than data on the SLAVE DATA BUS.

The microprocessor then changes the logic level of ADDS and WR to high, which indicates to the address latch 17, to the bus enabler 21 and thus the data bus driver 19, and to the peripheral device 13 the end of address transfer.

For a READ operation from the peripheral device 13, the microprocessor then sets the parallel data bus 1 and thus the parallel port connection 7 to input mode. The RD signal is set low, which indicates a read from the external device with the previously set address. As a result, the data bus driver receives the RD low signal at its R input, which causes it to transfer data appearing on the SLAVE DATA BUS via its peripheral data port to the data lines D7–D0, for reading by the microprocessor.

The RD signal is received by the addressed peripheral device 13, which causes it to apply data to the SLAVE DATA BUS.

The microprocessor then sets the RD signal to high logic level to indicate the completion of the read cycle. The peripheral device 13 ceases providing the data signal on the SLAVE DATA BUS, and the data bus driver 19 is inhibited from applying data therefrom to the data bus leads D7–D0.

For a write operation, after the completion of the address transfer steps, the data bus is loaded with data. The microprocessor sets the WR control signal to low to indicate a write to the peripheral device with the previously set address. With WR low, the data bus driver is enabled to transfer data signals which appear at its input from data lines D7–D0 to its peripheral data port, which applies the data to the SLAVE DATA BUS, for writing to the peripheral device 13.

The WR control signal is carried by the SLAVE WR lead from which it is received by the addressed peripheral device 13. The addressed peripheral device 13 is thereby enabled to receive the data from the SLAVE DATA BUS.

The WR control signal is then set high by the microprocessor 3, to indicate the completion of the write cycle, whereupon the data bus driver 19 is inhibited from passing data from the data leads D7–D0 to the SLAVE DATA BUS, and the peripheral device is inhibited from receiving data from the SLAVE DATA BUS.

The parallel data leads of the expansion bus can then be set by the microprocessor back to the input mode.

A low logic level transmitted from the peripheral device on the —ACK lead is carried by the parallel port connection 7 to the microprocessor 3, and indicates an interrupt request from the peripheral device. The signal can be wire ANDed with other signals from plural peripheral devices for interrupt service. The microprocessor 3 then identifies the interrupt source (for example, by polling) and services it accordingly.

The control signal leads described earlier with reference to the prior art can be reassigned to provide the control signals described with reference to the present invention, for example to control an external modem connected to the parallel port, as follows.

| parallel port signal line | to be reassigned as |
|---|---|
| -STROBE | ADDS |
| -INIT | WR |
| -SLIC IN | RD |
| -ACK | -ACK (INTERRUPT) |
| D7–D0 | bidirectional data bus |

It may be seen from the above that the preferred RD read signals should define active low, output, and the data bus driver should provide data on the SLAVE DATA BUS on the rising edge of this signal. The preferred WR write signals should define active low, output, and indicates a write cycle to a peripheral device. Data should be available on the SLAVE DATA BUS for the peripheral device and a rising edge indicates completion of the write cycle.

The preferred ADDS address valid signal signifies active low, output, and indicates that the current write cycle is for latching the address to the SLAVE ADDRESS BUS. Address data should be provided on the data bus and the rising edge of this signal indicates the completion of the address transfer.

The —ACK interrupt, active low, input signal indicates to the microprocessor that an interrupt request from the external device is present.

It will be recognized from an understanding of the above-described invention that it is not limited to a data bus or peripheral data port having 8 data lines, but may have more, e.g. 16, or fewer e.g. 4. The control signals may also contain as many bits as desired, and may be formed in more than one strobe cycles. Further, rather than the parallel port and the present invention being controlled from the microprocessor 3, it can be controlled from any controller that is capable of providing the signals described, such as a specialized circuit used in the personal computer connected to the expansion bus, or any controller which can communicate with the expansion bus.

A person understanding this invention may now conceive of alternative structures and embodiments or variations of the above. All of those which fall within the scope of the claims appended hereto are considered to be part of the present invention.

I claim:

1. A method of communicating with peripheral devices via a personal computer parallel port having computer data bus lines but no address bus lines, comprising connecting the input of a multiplexer to the parallel port, the multiplexer having a data bus input and a data bus output and an address bus output, applying address data to the computer data bus lines, applying an address control signal to the multiplexer and passing the address data only to the address bus output as a result thereof.

2. A method as defined in claim 1 including the further steps of ceasing application of the address data to the computer data bus lines, ceasing the address control signal, applying a data read signal to the multiplexer and to a peripheral device connected to the address output and the data bus output, writing data to the data bus output from the peripheral device, and passing the data from the data bus output to the computer data bus lines.

3. A method as defined in claim 1 including the further step of ceasing application of address data to the computer data bus lines, ceasing the address control signal, applying computer data to the computer databus, applying a data write signal to the multiplexer and to a peripheral device connected to the address output and the data bus output, and passing the computer data only to the data output as a result thereof.

4. A method of communicating with peripheral devices via a personal computer parallel port comprising multiplexing a data bus connected to the parallel port between address data, computer data for writing to an addressed peripheral device, and peripheral data received from the addressed peripheral device, and providing control signals signifying states defining which of said address data, computer data or said peripheral data is to be carried by the data bus.

5. A bus interface for interconnecting a computer data bus with a peripheral device, comprising a multiplexer having a computer data bus port, a peripheral data bus port and a peripheral address bus port, the multiplexer including means for receiving an address control signal and in response passing data appearing at the computer data bus port to the peripheral address bus port, the multiplexer including means for receiving a write control signal and in response passing data appearing at the computer data bus port to the peripheral data bus port, and the multiplexer including means for receiving a read control signal and in response passing data appearing at the peripheral data bus port to the computer data bus port.

6. A bus interface as defined in claim 5 including means for providing the write control and read control signals to a peripheral device.

7. A bus interface as defined in claim 5 in which the means for receiving an address control signal and for passing data to the peripheral address bus port is an address latch.

8. A bus interface as defined in claim 5 in which the means for receiving the read and write control signals and for passing data is comprised of a bidirectional bus driver for passing data in respectively opposite directions depending on whether the read or write control signal is received thereby.

9. A bus interface as defined in claim 8 in which the means for receiving an address control signal and for passing data to the peripheral address bus port is an address latch.

10. A bus interface as defined in claim 5, including a computer databus having plural lines, one group thereof for carrying data, and another group thereof for carrying STROBE, INIT, SLIC IN, and ACK signals from a microprocessor, and means for applying the address control signal on the STROBE line, the write control signal on the INIT line, the read control signal on the SLIC IN line, and an interrupt signal from a peripheral device on the ACK line, the group carrying the data being connected to the computer databus port.

11. A bus interface as defined in claim 9, including a computer databus having plural lines, one group thereof for carrying data, and another group thereof for carrying STROBE, INIT, SLIC IN, and ACK signals from a microprocessor, and means for applying the address control signal on the STROBE line, the write control signal on the INIT line, the read control signal on the SLIC IN line, and an interrupt signal from a peripheral device on the ACK line, the group carrying the data being connected to the address latch and to the bidirectional driver.

12. A bus interface as defined in claim 5, including plural peripheral devices, each having an address bus port and a databus port, each having a different address, the address bus port of each peripheral device being connected to the peripheral address bus port of the multiplexer, the databus port of each peripheral device being connected to the peripheral databus port of the multiplexer.

13. A bus interface as defined in claim 11, including plural peripheral devices, each having an address bus port and a databus port, each having a different address, the address bus port of each peripheral device being connected to the peripheral address bus port of the multiplexer, the databus port of each peripheral device being connected to the peripheral databus port of the multiplexer.

* * * * *